(12) United States Patent  (10) Patent No.: US 8,035,525 B2
Noonchester  (45) Date of Patent: *Oct. 11, 2011

(54) EMERGENCY WORKER RESCUE APPARATUS

(76) Inventor: Joseph W. Noonchester, Stanwood, WA (US)

( * ) Notice: Subject to any disclaimer, the term of this patent is extended or adjusted under 35 U.S.C. 154(b) by 473 days.

This patent is subject to a terminal disclaimer.

(21) Appl. No.: 12/125,401

(22) Filed: May 22, 2008

(65) Prior Publication Data

US 2009/0320207 A1    Dec. 31, 2009

Related U.S. Application Data

(63) Continuation-in-part of application No. 11/331,687, filed on Jan. 13, 2006, now Pat. No. 7,394,387.

(51) Int. Cl.
*G08B 23/00* (2006.01)

(52) U.S. Cl. ............. 340/573.1; 340/673; 340/4.1; 2/44

(58) Field of Classification Search ................ 340/573.1, 340/691.1, 825.4, 673, 825.19; 2/463, 467, 2/25, 1, 44; 280/47.131; 5/626
See application file for complete search history.

(56) References Cited

U.S. PATENT DOCUMENTS

| 4,815,761 A | 3/1989 | Henderson et al. |
| 4,848,714 A | 7/1989 | Ziaylek, Jr. et al. |
| 5,131,670 A | 7/1992 | Clements et al. |
| 5,393,080 A | 2/1995 | Ross |
| 5,492,346 A | 2/1996 | Stadler et al. |
| 5,947,351 A | 9/1999 | Garofalo et al. |
| 6,047,983 A | 4/2000 | Day, III |
| 6,341,789 B1 | 1/2002 | Checa et al. |
| 6,565,103 B2 | 5/2003 | Wilson |
| 6,799,769 B2 | 10/2004 | Ziolkowski |
| 6,824,150 B2 | 11/2004 | Simione |
| 6,845,523 B2 | 1/2005 | Copp |
| 6,845,533 B1 | 1/2005 | Tulette |
| 7,124,454 B2 | 10/2006 | Walkingshaw |
| 7,394,387 B2 * | 7/2008 | Noonchester .............. 340/573.1 |

* cited by examiner

*Primary Examiner* — Toan N Pham
(74) *Attorney, Agent, or Firm* — Matthew Jellett

(57) ABSTRACT

A rescue device which attaches to the frame of a self-contained breathing apparatus carried on the back of emergency workers such as firemen, hazardous-waste cleanup crews, and other individuals entering into hostile environments. The rescue device is adapted to connect to the frame of existing self-contained breathing apparatus frames or racks. In one form, the rescue device has a top and bottom frame which connects to the SCBA tank at the top and bottom locations. The frames project around the body of the SCBA tank and extend out to position rolling elements for providing the transportation needs. The frames are connected to the tank of an SCBA by way of a quick-release linkage system. The frames have at the rolling elements ends wheel forks which contain wheels having axles. In another embodiment a skid plate is attached to the ends of the frames in conjunction with the protruding wheels or by itself without rolling elements. Other ways of creating the reduction in frictional drag are provided such as a sled type configuration and a track system.

24 Claims, 8 Drawing Sheets

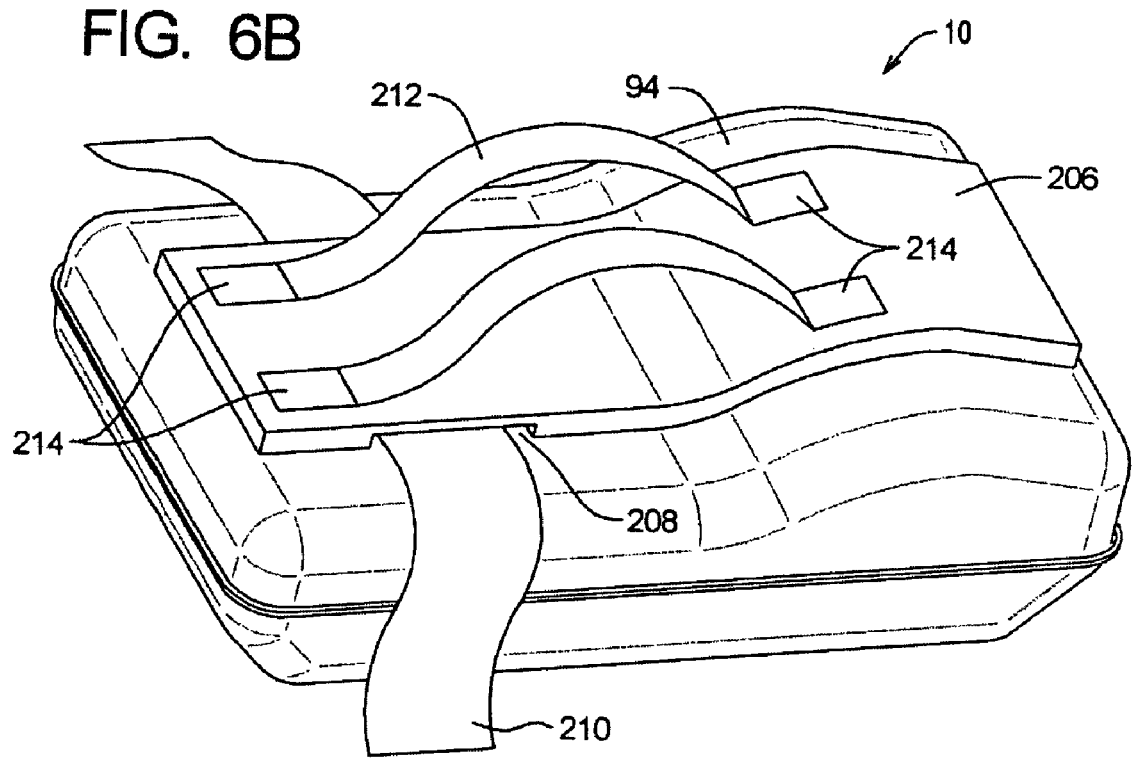

EMERGENCY WORKER RESCUE APPARATUS

RELATED APPLICATIONS

This application claims priority benefit, and is a continuation in part of earlier filed U.S. application Ser. No. 11/331,687 filed Jan. 13, 2006 now U.S. Pat. No. 7,394,387.

BACKGROUND OF THE INVENTION a) Field

Generally speaking, the field of this concept relates to apparatuses for extracting injured emergency care workers or emergency workers such as firemen, first aid, first response, industrial hazard workers, military rescue personnel, and other individuals who enter into highly hostile environments. The concept deals with attaching in some form a transportation device to the back of the injured emergency worker to facilitate ease of transportation or extraction of the injured personnel out of the hostile environment.

b) Background Art

Self-contained breathing apparatuses or SCBAs are used by emergency workers such as firemen, first aid, first response, industrial hazard workers, military rescue personnel, and other individuals who enter into highly hostile environments to mitigate the emergency. These hostile environments include earthquake zones, fire zones, industrial contamination sites such as natural gas leaks, and other areas which require the use of a self-contained breathing apparatus to enable the emergency worker to operate within that hostile environment.

In discussing fire departments and fire response teams, there are specific modes of operation or standards in place to rescue a fireman who has been injured and incapacitated. Generally the firemen entering into a superheated environment weigh between 250-300 lbs. gross weight making it very difficult to extract the fireman from the burning building. Therefore the firemen train for that specific weight and cannot in certain instances qualifies for positions on the fire department team if they cannot pull the dead weight of such an injured fireman. In addition, when an actual fireman is injured in a burning building for example, the rescue team is made up of 3-4 firemen entering into the building to extract the injured team member. They may have to take in equipment to adequately secure the injured team member so as not to further exacerbate the individual's injury, or it may be that the grouping of 3-4 individuals makes it cumbersome to extract the injured person.

The following prior art discusses in some form rescue devices for transporting an injured rescue worker or injured person.

U.S. Pat. No. 6,845,533 (Tulette) discloses a patient transport board which seems to be used for ambulance and emergency care workers. The board has a flat rigid surface on which the patient lies and restraining straps are provided to secure the patient. At the back of the rigid board are a pair of foldable rail members which run the entire length of the board and which are attached to the outside longitudinal edge of the board and can be pivoted and extended so that the patient can be moved down a flight of stairs. A skid plate is also provided at the foot end of the board to allow for positioning of the patient in somewhat of an upright position when moving through tight spaces.

U.S. Pat. No. 6,824,150 (Simione) discloses a cart for transportation of personnel and material in hazardous environments. The cart is made of fire protective materials and is also designed to be buoyant and float. In general, this seems to be more of a gurney-type transportation device which has extendable head frame and leg frame support portions and is also designed to be separately brought into the emergency situation at which time the rescuers would load the injured individual onto the gurney.

U.S. Pat. No. 6,799,769 (Ziolkowski) discloses a welding cylinder dolly or in other words a hand truck, which enables individuals to load, unload and transport cylindrical objects from one location to another. The hand truck or transport uses a pair of vertical support members which act together and form a forwardly facing contact area joined by a cross member having a recessed configuration. An adjustable restraining strap has a free end with an attachment member and an opposing anchor end to substantially encircle the cylindrical object and frictionally retain it between the cross members and the restraining strap.

U.S. Pat. No. 6,565,103 (Wilson) discloses a scuba tank caddie having an optional gear drying rack and an optional portable shower, and its method of fabrication. Referring to column 2 at line 65, the scuba tank caddie has a tank holder which holds at least one tank. The tank holder has a top and a bottom with a rear wall and floor for supporting the tank itself, an axle which is two ends and is rotatably mounted to the tank holder and two wheels. The wheels may be retractable for using the caddie in water and also storage of the caddie when not in use. The retracting means in the current embodiment is an over center cam lever. A handle has a handle stem and handle bar which is coaxially oriented and can be collapsed or extended. Also further down in column 3 at line 57, a reservoir is provided for storing a volume of fresh water in combination with a low pressure quick disconnect hose to transmit the fluid from the reservoir to a showerhead to provide for showering.

U.S. Pat. No. 6,341,789 (Checa et al) discloses a two wheeled hand cart for transporting scuba gear. The cart in this situation comprises an elongated sheet having a top end and a bottom end, a planar front surface and a generally planar back surface. At the base is attached a pair of guides or wheels which are connected between an elongated shaft. The scuba gear can be loaded onto this hand cart and transported to the dive location.

U.S. Pat. No. 6,047,983 (Day) discloses a portable combination hand truck and valet valise. The hand truck has a hinged double shell which is foldable into a closed position, creating a tube like enclosure when stored, and when opened provides the frame for the hand cart. Referring to column 2 around line 12, a pair of wheels are sized to fit within the tube and adapted for easy attachment to and detachment from the axle. A handle is attachable to the hinged double shell in the open position.

U.S. Pat. No. 5,947,351 (Garofalo et al) discloses a cylinder carrier which is made of an elongated post and includes a sleeve and an extension piece retained within the sleeve. The extension piece has a handle at the protruding end to operate the carrier. At the base of the carrier are a pair of cylinder rests on either side of the vertical sleeve. The cylinder rests can be folded up against the vertical sleeve for storage. Cylinder straps are positioned approximately mid-height of the vertical sleeve and are disposed to retain the cylinders on top of the rests. A pair of shoulder straps are attached to the vertical sleeve or post to be worn on the back of the carrier. Two small wheels are located at the bottom or base of the vertical post or sleeve for transportation.

U.S. Pat. No. 5,492,346 (Stadler et al) discloses a scuba tote which has wheels at the base and a cover with formfitting recesses to store the scuba tanks. Within the recesses at the top and bottom, are shelves to maintain the position of the tanks.

The interior of the cover or body is sealed to keep a constant atmospheric pressure for pressure equalization purposes.

U.S. Pat. No. 5,393,080 (Ross) discloses an aquatic air tank dolly which has a cup to secure the base of the tank and supports connected to wheels for conveniently moving the tank. Side rails are attached to the cup at the base of the tank and also attached to the valve stem at the top of the tank. The side rails are adapted for supporting additional diving equipment U.S. Pat. No. 5,131,670 (Clements et al) discloses a detachable scuba tank overland transport device which enables users to move scuba tanks over ground instead of having to carry the device. The transport has an elongated axle with a wheel rotatably mounted at the ends of the axle. Two small tank-engaging members are provided and connected to the axle. The tank-engaging members are rotatable about the axle from a stored position to an open position. One of the members has a support platform for supporting the scuba tank; each member has a sidewall engaging portion for engaging the sidewall of a scuba tank inserted between the sidewall engaging portions and resting upon the support platform.

U.S. Pat. No. 4,848,714 (Ziaylek Jr. et al) discloses a mounting plate with rollers; the mounting plate is the type that is generally used by firemen or firefighters and rescue or emergency squads. The rollers themselves are connected to the free ends of the springlike clamp arms which contain the air cylinder. The location and extent or projection of the rollers on the clamp arms makes the insertion and removal of the air cylinders or self-contained breathing apparatus more efficient.

U.S. Pat. No. 4,815,761 (Henderson) discloses an amphibious scuba assist device which is designed to help diverse transport scuba tanks and other diving gear across sandy beaches and other shoreline and also is provided as an offshore floating work platform and a dive flag holder during diving operations. The frame is configured using a hollow tubing and has a forward member, a rearward or aft member, and two side members. Handle members extend along the sides and support the buoyant plastic foam cylinders connected to the handle. The frame carriers support surface and straps retain the tanks and other gear on the frame.

BRIEF DESCRIPTION OF THE DRAWINGS

FIG. 6B is a top perspective view of the integrated self-contained breathing rescue apparatus with a backrest;

DETAILED DESCRIPTION OF THE PREFERRED EMBODIMENTS

The general thrust of this concept is to create an apparatus to aid in the extraction of injured emergency workers such as firemen, first aid, first response, industrial hazard workers, military rescue personnel, and other individuals who enter into highly hostile environments to make environments safe. These hostile environments include such areas as earthquake zones, fire zones, industrial contamination sites including natural gas leaks, and other areas which require the use of self-contained breathing apparatuses carried generally on the back of the emergency worker. For the most part these self-contained breathing apparatuses have pressurized oxygen tanks which attach to a frame carried by the emergency worker on the emergency worker's back.

The first response team of firefighters is usually the forerunner in setting standards for the use of self-contained breathing apparatuses. One of the standards within the firefighting industry is to drag a fully equipped dummy weighing approximately 200-300 pounds a certain distance. Firemen who cannot carry this dummy by dragging the fictional injured emergency worker the prescribed distance cannot become fully active firemen. Additionally, the standard operating procedure for rescuing a downed fireman within a burning building includes the use of 3-4 firemen to drag the individual out of the building safely.

This concept attaches a series of frictional drag reducing elements such as rolling wheel systems, track systems, skid plate systems, and other derivations of the above to the frame or tank portions of the self-contained breathing apparatus enabling a single rescuer to extract the harmed worker. In one embodiment, the rescue device temporarily attaches to pre-existing tanks or frames. In another embodiment, the self-contained breathing apparatus is integrated into a rescue device providing rolling elements and skid plates.

Figure 1:
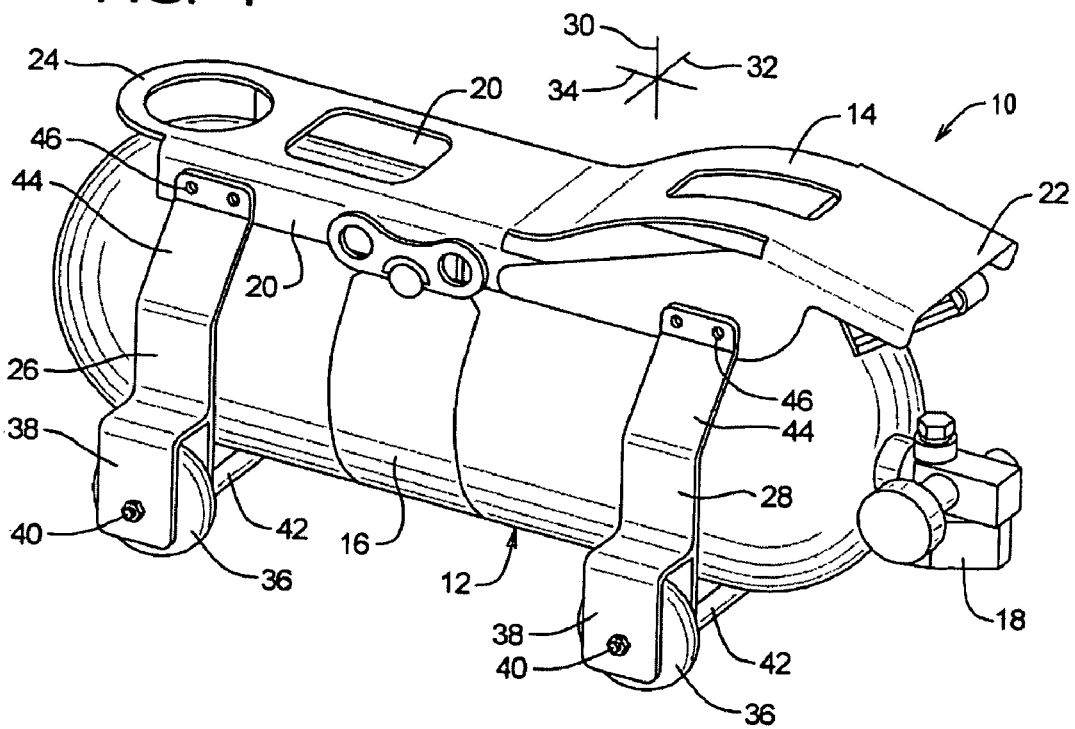
FIG. 1 is a perspective view of the rescue apparatus attached to a self-contained breathing apparatus frame.

Generally speaking, the current embodiment as seen in FIG. 1, is a rescue apparatus 10 which is designed to aid rescuers in the removal of injured emergency workers who have entered into a hostile environment and who are using in some form, a self-contained breathing apparatus 12 or SCBA 12.

For the most part, self-contained breathing apparatuses 12 are utilized by the firefighting industry, the mining industry, the environmental cleanup industry, the military branches, and other industrial type applications. The National Fire Protection Association (NFPA) is the association which sets the standards for the use of self-contained breathing apparatuses within hostile/hazardous environments. When the firefighting industry adopts certain standards, usually the military and industry follow suit.

By way of background, the self-contained breathing apparatus 12 usually carries compressed air at a pressure between 2500-4000 pounds per square inch so that the worker entering into the hostile environment can breathe unrestricted when the hostile environment is filled with unbreathable or toxic vapors and gases. Also, the hostile environment may have temperature ranges which would superheat the air and become unbreathable.

Many times the emergency worker such as the fireman will be faced with a situation which is physically hazardous and there is always a risk that the fireman will be injured. Thus, much firefighting training is focused around extracting the downed fireman from that hazardous or hostile environment. Standards require 2-4 firemen to enter into the hostile region to extract the downed firemen. The reasons for this are for the downed fireman's successful extraction, as well as the physical ability of the other firemen to extract the downed or injured person. The injured person usually will be carrying close to 50% or 100% percent of his or her body weight in equipment, and it is not uncommon to have the gross weight of the fireman in the range of 250 lbs., which includes personal body weight and the weight of the equipment. As a consequence, dragging the injured worker out of the hazardous area can be cumbersome if assistance is not readily available.

Entering into a hostile environment, which may have superheated air through a burning environment, firemen are required to wear the self-contained breathing apparatus on their backs. The rescue apparatus 10 is incorporated onto or within the self-contained breathing apparatus 12 by attaching in the current embodiment a frictional drag reducing device or section. This frictional drag reducing device can take the form of various embodiments such as a skid plate, a track system, a rail system, a rolling system, and other types of configurations that reduce the frictional drag when moving a downed fireman out of the hazardous environment.

Figure 2:
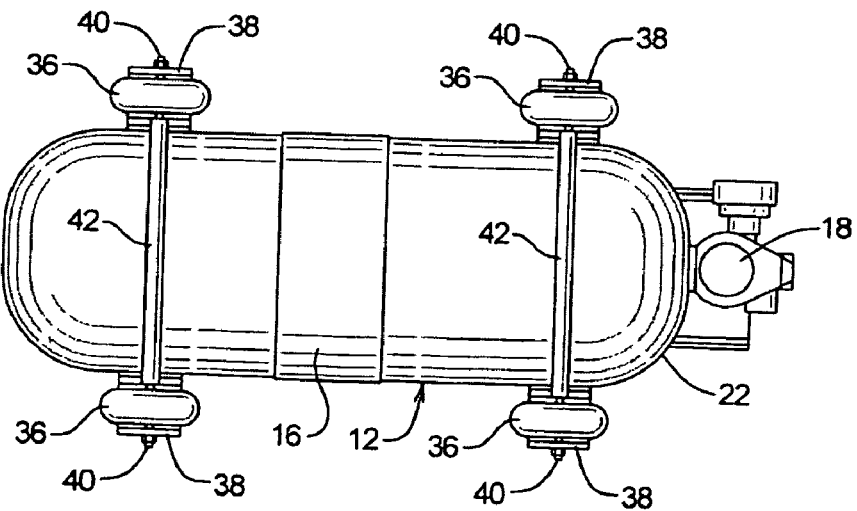
FIG. 2 is a bottom plan view of the rescue apparatus attached to the self-contained breathing apparatus frame.

Generally speaking as seen in FIGS. 1 and 2, the rescue apparatus 10 is connected to a pre-existing SCBA frame 14 or tank 13. The SCBA frames 14 have a forward end 22 and a rearward end 24 arranged about a longitudinal axis 34, a lateral axis 32 and a transversely aligned axis 30. The spine of the fireman for example, would be somewhat parallel to the longitudinal axis 34 and the forward end 22 would be positioned at the general top spinal location or at the head of the fireman.

In the present embodiment, the rescue apparatus 10 has a plurality of wheels 36 which are attached and held in place by forks 38 which extend from frame legs 44. The frame legs attach to the SCBA frame 14 forward and rearward locations. The leg attachment 46 in this current embodiment is accomplished by the use of two through bolts which bolt the frame legs 44 to the side walls 20 of the SCBA frame 14.

Thus in this current embodiment, the rescue apparatus 10 has a pair of forward connection frames 28 and a pair of rearward connection frames 26 which act as the carriage for carrying the downed fireman when he is lying on his back face up and looking in the positive transverse direction.

To keep the leg frames 44 from bowing outwards due to the increased load placed on the SCBA frame 14 when the incapacitated fireman is prone on his back, a strut member 42 connects the rear connection frame members 26 together as well as another forward strut 42 connecting the forward connection frame members 28.

The carriage frame or rear connection frame 26 and 28 in one form are arranged so that the frame itself surrounds the self-contained breathing apparatus 12 without causing undue pressure on the SCBA walls themselves.

In an alternative embodiment, the rear connection frame 26 and forward connection frame 28 may be easily detachable through a quick release leg attachment mechanism which facilitates the installation and removal of the rescuing apparatus 10 if for example, the downed fireman did not have a rescue apparatus 10 attached to his back prior to entering into the hazardous environment.

A discussion of an alternative embodiment will now be provided. An alternative embodiment provided below is one embodiment of a general alternative embodiment, that being either a frame or a tank connection component which has a linkage apparatus which provides for clamping onto a tank portion of an SCBA or the Frame portion of the SCBA. As previously discussed, an SCBA has a first side and a second side. These first and second sides are generally on the right and left side of the tank or in other words the opposing lateral sides of the tank. Still generally speaking, the linkage has a first portion which will frictionally engage the first side of the SCBA tank. The linkage also has a second portion which will frictionally engage the second side of the SCBA tank. Lastly, a third portion of the linkage is configured to adjust the opening distance between the first portion and second portions of the linkage which enables the users of the connection device to adjust the device to fit varying diameters of various SCBA's as well as to adjust the clamping force which impinges on the tank. Now a detailed discussion of one of the alternative embodiments of this connection proponent will now be provided.

Figure 11:
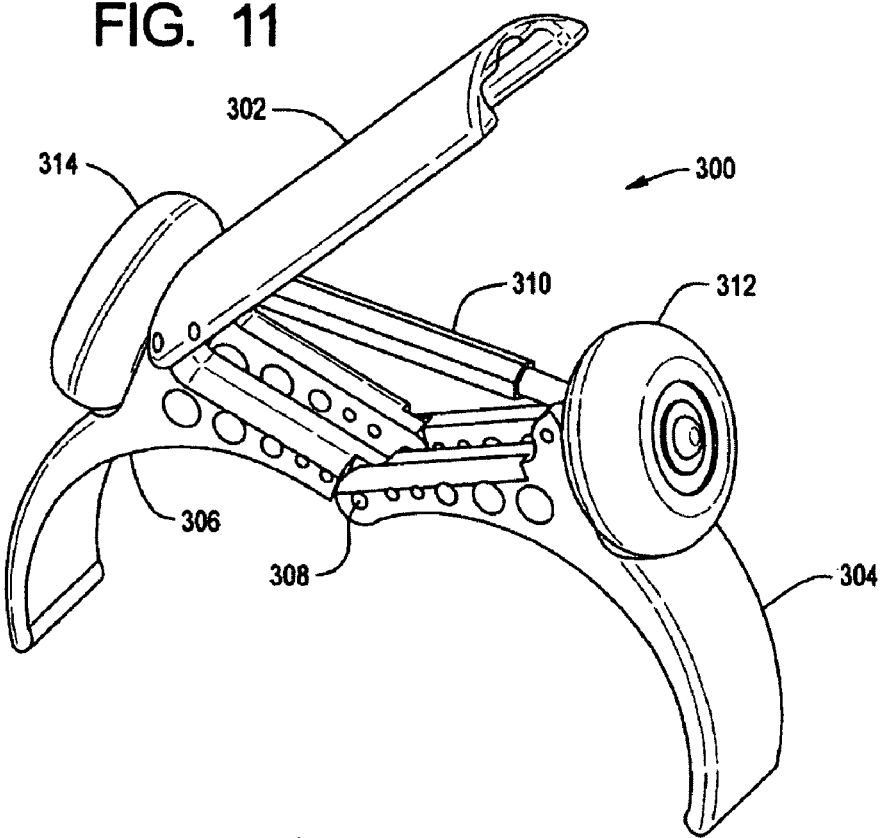
FIG. 11 is a perspective view of the rescue apparatus in one form configured to removably attach to an SCBA tank.
Figure 12:
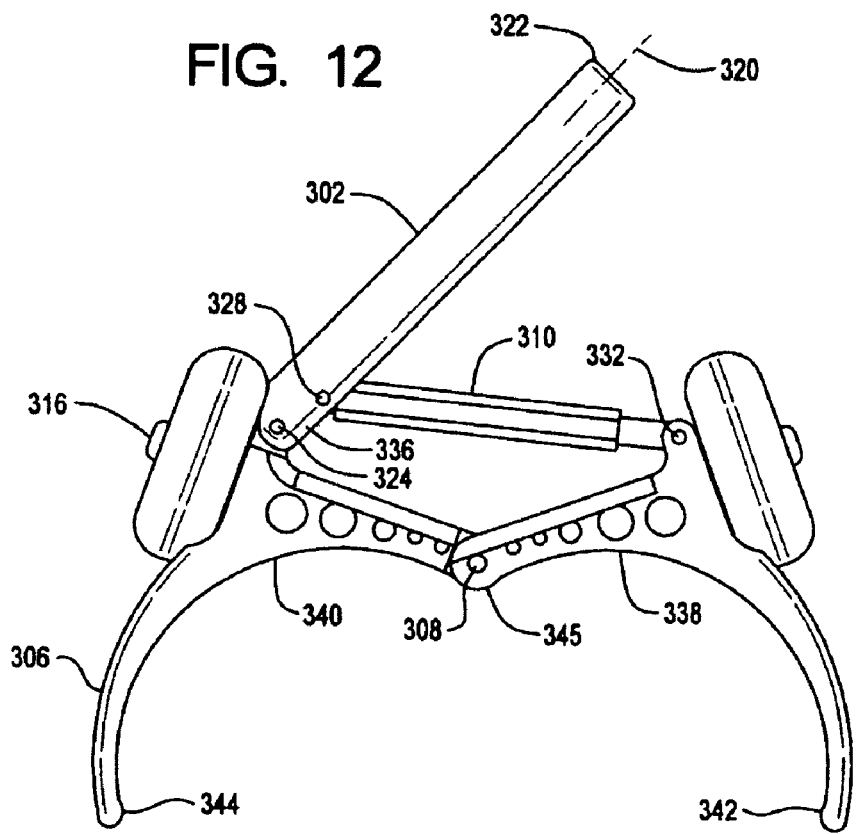
FIG. 12 is an end view of the rescue apparatus in one form configured to removably attach to an SCBA tank.

Referring now to FIG. 11, an alternative embodiment is shown. Here a rear connection frame 26 and forward connection frame 28 easily detachable quick release leg. This alternative embodiment is a quick-release rescue apparatus 300. In each of the quick release legs, the laterally aligned strut is configured as an adjustable lever arm 302 which has a portion of this the laterally aligned strut configured as an adjustable lever arm 302 which is arranged along (as seen in FIG. 11A) a radial lever arm axis 320. The radial axis 320 emanates from an origin point of a longitudinally aligned lever arm hinge 326. The free end of the lever arm is the upper arm portion 322 where the lever arm terminates; the lever arm begins at the lower pivot point 324 where the lever arm hinge 326 is connected to the second semi-cylindrical clamping member 306 (as seen previously in FIG. 11). Radially positive from the origin point of the lever arm hinge 326 is an intermediately positioned turn buckle lever arm hinge 328. The turn buckle 310 is positioned to act as a compression strut enabling the adjustable lever arm 302 when moved to its closed position to provide a clamping force about the SCBA tank 13. A four-bar linkage system is utilized to exert a clamping force from the lever arm 302 and clamp the first and second semi-cylindrical clamping members 304 and 306 respectively about the SCBA tank 13.

In order to do so, the four-bar linkage mechanism includes a first bar 334 which is located between the longitudinally aligned lever arm hinge 326 and the intermediately positioned turn buckle hinge 328. The second bar 336 is the turn buckle member 310, which is positioned between the intermediately positioned turn buckle hinge 328 and the turn buckle frame hinge 332. The third bar 338 is a portion of the first semi cylindrical clamping member 304; the third bar being positioned between the turn buckle frame hinge 332 and the longitudinally aligned pivot joint 308. Lastly, the fourth bar 340 is substantially a mirror image of the third bar 338, the fourth bar being positioned between the longitudinally aligned pivot joint 308 and the longitudinally aligned lever arm hinge 326, thus completing the closure of the four-bar linkage system. In operation, exerting a downward force when the adjustable lever arm 302 is in the open position activates the longitudinally aligned lever arm hinge from its angular position to an alignment with the turn buckle. Thus a net resultant compression force in the pivoting turnbuckle 310 exerts a clamping force tangential to the longitudinally aligned pivot joint 308. A closing force on the first and second semi-cylindrical clamping members is applied where the first clamping point 342 and the second clamping point 344, both apply nearly equal but opposite impinging forces upon the tank portion 13 of the SCBA. This also exerts a resultant force onto the SCBA tank 13 which is applied against the third clamping point 346 that being the bottom portion of the longitudinally aligned pivot joint. In one form, the clamping points 342, 244, and 346 may include a malleable surface to increase the frictional resistance to counter any torsional forces applied to the SCBA tank 13 while the apparatus is in use (for example, overturning of a fireman from a face down/prone position to a face up back position).

Figure 3:
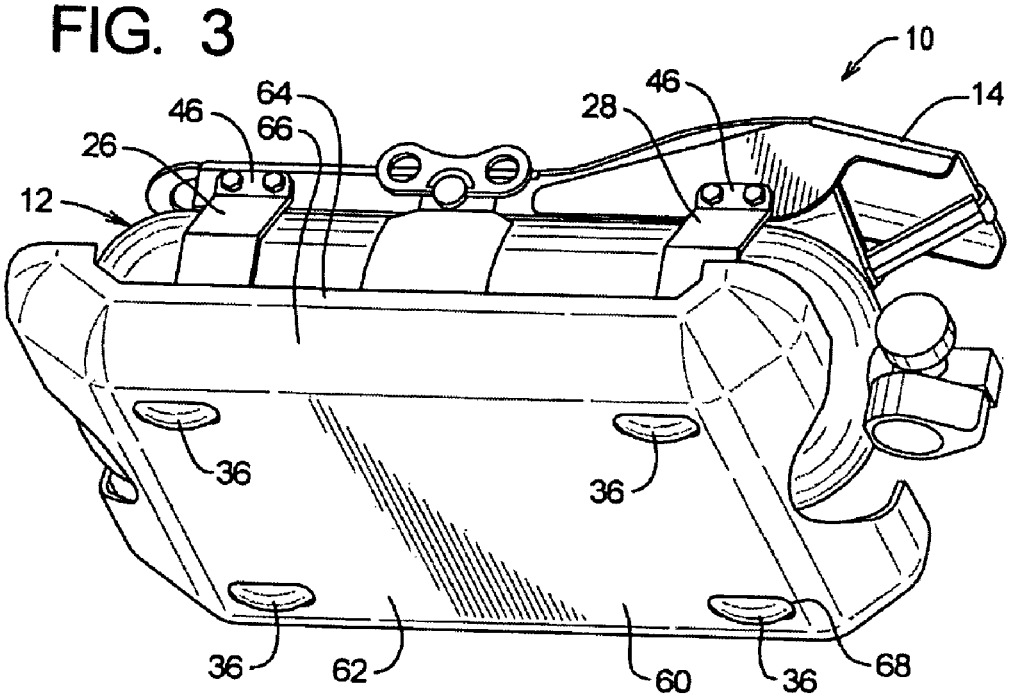
FIG. 3 is a bottom perspective view of the rescue apparatus with a skid plate and rolling wheels attached to the frame of the self-contained breathing apparatus.

The same quick release mechanism may be utilized in the skid plate version of FIG. 3 or the other embodiments given that adaptations may be made to access the adjustment lever. When fully closed, the top outer shell surface of the lever arm 302 acts as a skid plate to ramp over small obstacles during the rescue.

While a plurality of quick release legs which are substantially connected at the forward and rearward portions of the tank are disclosed, a single quick release leg may also be utilized. In this embodiment, the single quick release leg may be positioned at the center of the tank, or at either end depending upon the situation and desired weight balance. This embodiment would reduce the weight carried by a rescuer, but may not provide as much support as the multiple leg embodiments.

The above single quick release leg may be utilized and incorporate multiple SCBA semicylindrical clamping members which provide for either a two-wheeled apparatus, three-wheeled apparatus, four wheeled apparatus, five wheeled apparatus and so on depending upon the desired configuration.

Furthermore, additional improvements may include shock absorbing type system for preservation or to reduce the potential damaging effect of dragging the downed rescue worker when, say for example, the rescue worker may be suspected of having spinal cord injury etc.

It is conceived that while it is provided that the present quick release rescue apparatus 300 attaches directly to the tank 13 of the SCBA, alternative embodiments may include the quick release rescue apparatus 300 connecting directly to the frame member of the SCBA in lieu of the tank utilizing a similar four-part linkage system as discussed above.

As previously mentioned, the current embodiment is designed so that the rear connection frame 26 and forward connection frame 28 do not interfere with the working components of the SCBA 12 such as the air valve and air port 18 as well as the mounting strut 16 to hold the SCBA tank 13 to the SCBA frame 14.

While the current embodiment as seen in FIGS. 1 and 2 utilizes the rear connection frame 26 and forward connection frame 28 with fixed wheels 36 Rota table about axles 40 and provides a lightweight and simple way of achieving the transportation of the downed fire worker out of the hostile environment, the protruding rear connection frame forks 38 and forward connection frame forks may accidentally catch or snag objects within the hostile environment.

Figure 4:
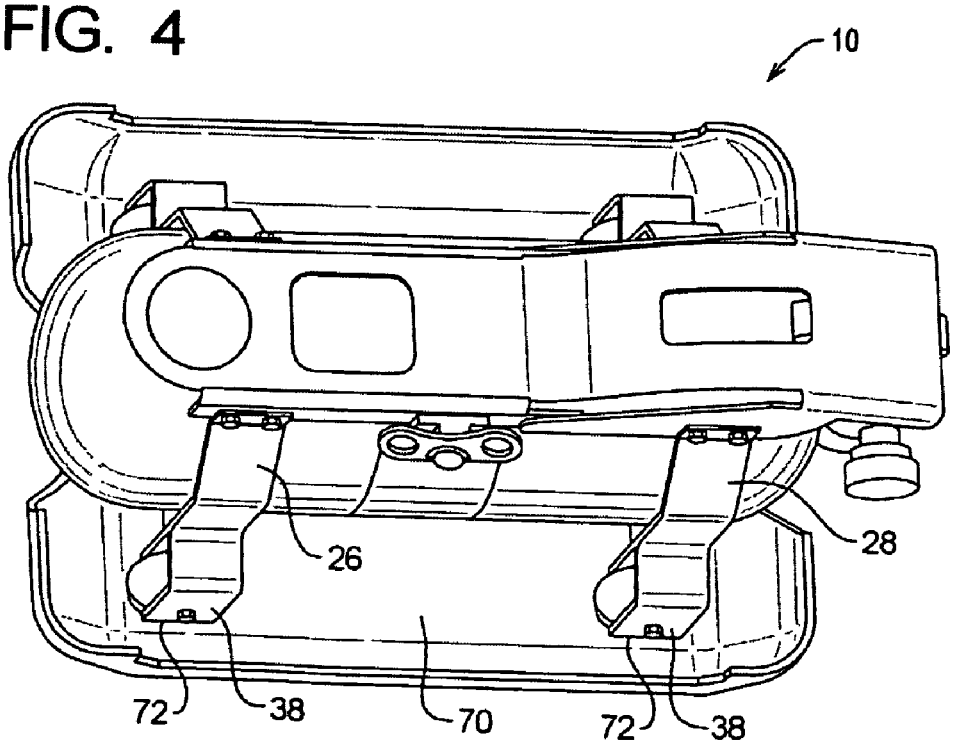
FIG. 4 is a top perspective view of the rescue apparatus with a skid plate and rolling wheels attached to the frame of the self-contained breathing apparatus.

To mitigate these hang-ups while dragging the fire worker out of the hostile environment, an alternative embodiment is provided (as shown in FIGS. 3-4) utilizing a skid plate which has a smooth outer surface and can be used to facilitate movement over large objects or down a series or set of stairs which might pose a traversing problem utilizing just the previously mentioned embodiment.

Also, the addition of a skid plate or a sled type configuration placed on the outside of the self-contained breathing apparatus either as a replacement for the wheels or rolling elements 36 used in conjunction with the forward and rearward frames, enables the rescue apparatus 10 to reduce snagging of obstacles during a rescue operation, such obstacles including fire hoses and other environmental hazards. The shell or skid plate acts as an additional heat shield to further protect the fire fighter, the skid plate will more readily enable the rescuer to move the victim in various directions; also the distribution of the load over a larger surface area will decrease the frictional drag.

In addition to providing a reduction in frictional drag through the use of the skid plate, the increased visual area on the back of the emergency worker allows for additional identification indicia. For example, providing the seal of the local fire company, integrating lighting elements such as strobe lighting throughout the shell area to provide for identification of emergency workers or firemen within the smoky environments, as well as utilizing different illumination characteristics to indicate active fire workers or motionless fire workers. For example, using a color such as light green to indicate a fireman who is mobile and uninjured, and using an illuminated color such as red or yellow either fully on or having a periodic strobe light to indicate an injured fireman or emergency worker.

Referring to FIGS. 3 and 4, the rescue apparatus 10 in this alternative embodiment has a skid plate 60 which is arranged with a flat bottom outer shell 62 and has at right angles to the bottom 62 a perimeter sidewall 64. The transition between the substantially vertical perimeter sidewall 64 and the flat horizontal bottom outer shell 62 is made by curved radial corners 66 which act as an outer lip to ramp over small objects and debris which might be in the path of the escape route during the rescue operation.

The same rear connection frame 26 and forward connection frame 28 are utilized and the same leg attachment 46 is used to connect the frames to the SCBA frame 14. In FIGS. 3 and 4, the skid plate 60 is integrated with the wheeled frame carriage apparatus where the wheels 36 protrude out of the wheel ports 68 of the bottom surface 62 of the skid plate 60 to provide for the rolling transport operation.

Figure 9:
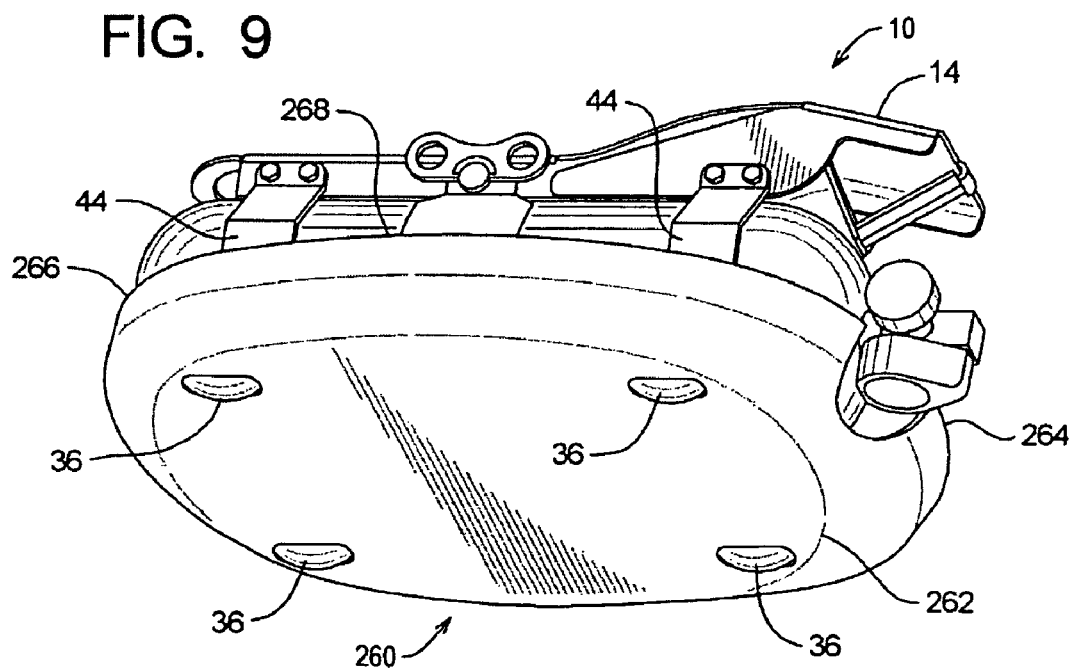
FIG. 9 is a bottom perspective view of the rescue apparatus with a semispherical skid plate.

In addition to the previously-mentioned alternative embodiment skid plate with a flat bottom outer shell arranged in somewhat of a rectilinear profile, as seen in FIGS. 3 and 4, an alternative embodiment of the skid plate is shown in FIG. 9, where the rescue apparatus 10 is attached to the SCBA frame 14 by the use of previously-mentioned forward and rearward legs 44 which are attached to a semispherical skid plate 260. The semispherical skid plate has an oval bottom profile 262 with a forward skid plate lip 264 which curves upwards or in the transverse direction as well as a rearward skid plate lip 266 which also curves upwards. The skid plate 260 also has side lips 268, which curve upwards thus achieving the semispherical shape. As previously mentioned in the above alternative embodiment FIGS. 3 and 4, the frame carriage also holds the wheels 36 which protrude out of the bottom surface of the skid plate 260 and provide for rolling transport operation.

Figure 10:
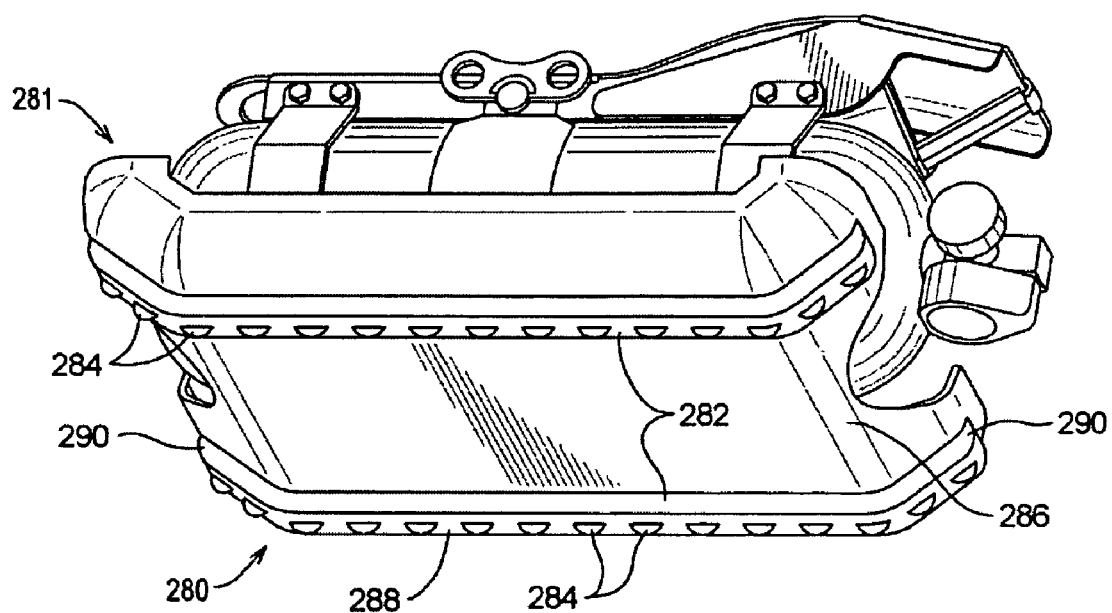
FIG. 10 is a bottom perspective view of the rescue apparatus with a rail system.

In lieu of using a skid plate type configuration, a sled type configuration 281 as seen in FIG. 10 is shown as an alternative embodiment utilizing a rail system 280. This rail system is composed of substantially two longitudinally aligned guide rails 282 which are substantially parallel with one another in the lateral direction and assist the rescuer to pull the injured fireman along over objects which may be in the path of escape. The longitudinal rails 282 each have a flat glide plate rail portion 288 as well as rail lips 290 at the forward end and at the rearward end of the sled apparatus 281. Additionally, instead of the rails having a smooth flat bottom, installation of glide wheels 284 along the longitudinal length of the rails 282 provide for smooth transport operation.

Figure 8:
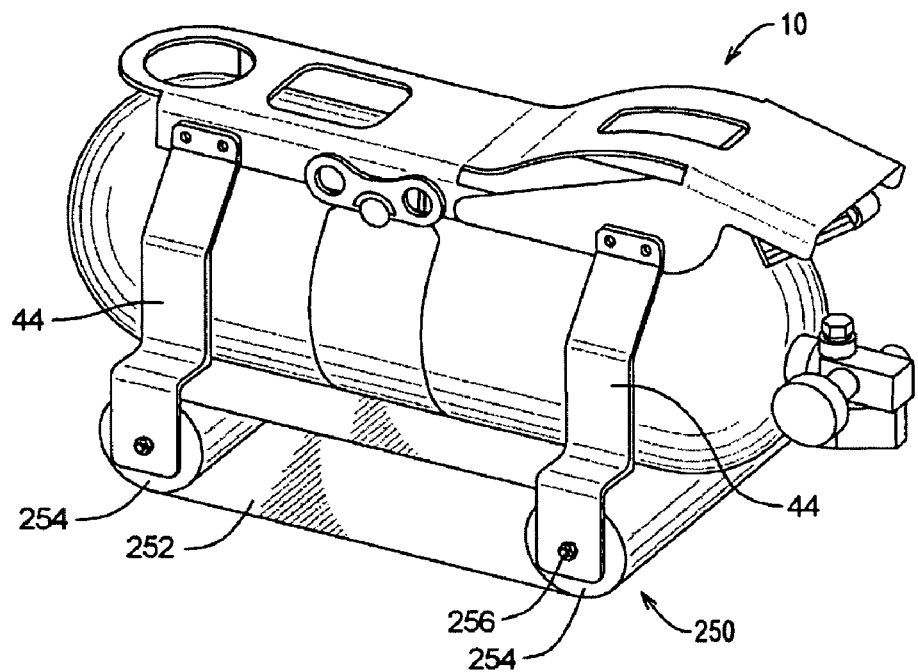
FIG. 8 is a top perspective view of the rescue apparatus with a track system.

Still discussing the alternative embodiments, the above mentioned track system 250 as seen in FIG. 8, for the transportation of the downed fireman as the rescue apparatus 10, utilizes a forward and rearward cylindrical track roller 254 which spans between the forward legs and rearward legs 44 and the cylindrical track roller 254 which rotates about a laterally aligned axle 256. A reciprocating track 252 is tensioned between the forward and rearward cylindrical track rollers to provide for the reduction in frictional resistance due to the dragging action of the fireman being rescued.

The frame in the current embodiment and the alternative embodiments are constructed of in one particular form, a lightweight strong heat and corrosion resistant material such as aluminum, carbon fiber, titanium, thermoset plastics, and the like. Using an aluminum type material provides for a reduction in unit weight of the rescue apparatus 10 as well as provides for adequate temperature resistance and structural rigidity.

Figure 5:
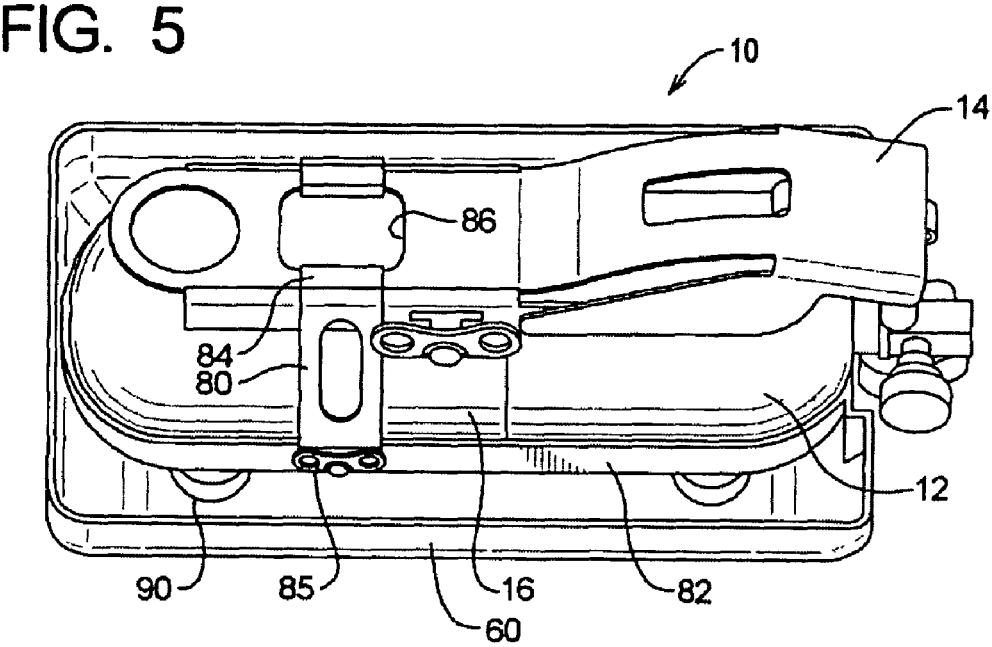
FIG. 5 is a top perspective view of the rescue apparatus using ball transfers.
Figure 6A:
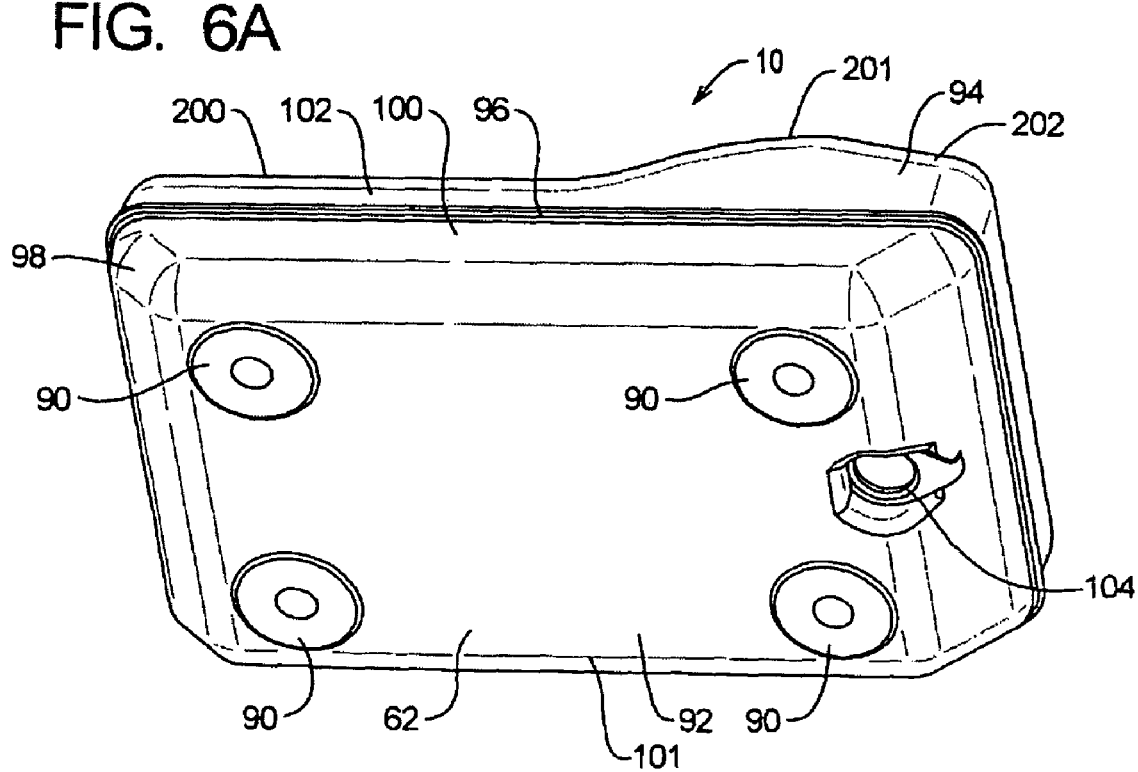
FIG. 6A is a bottom perspective view of an integrated self-contained breathing rescue apparatus with a bottom skid plate and ball transfers.
Figure 7:
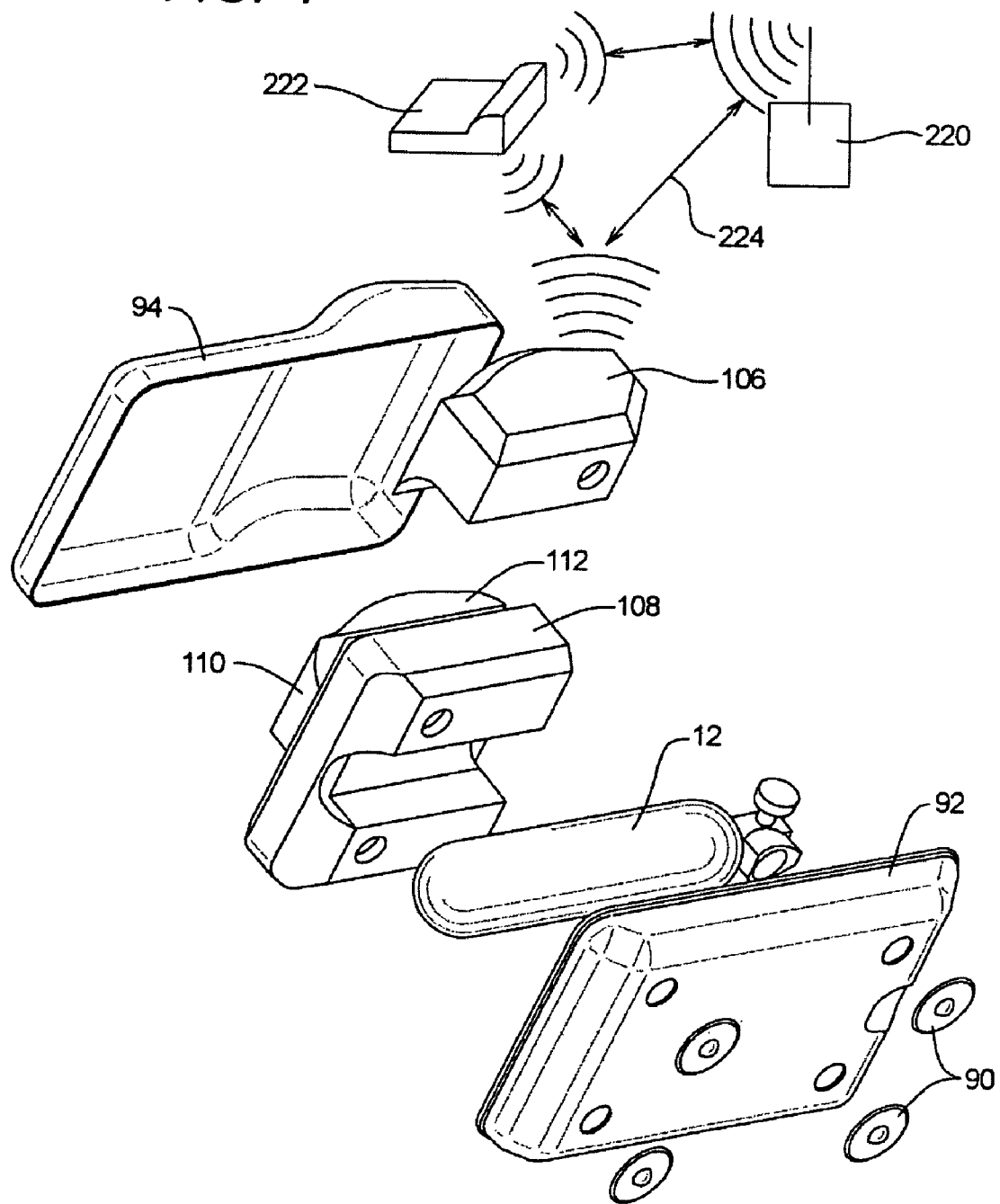
FIG. 7 is an exploded perspective view of the integrated self-contained breathing rescue apparatus.

The wheels 36 are replaceable with ball transfers 90 as shown in FIGS. 5, 6A, and 7), or other adequate multidirectional components such as the wheels 36 being connected to casters which are then connected to the bottom legs of the rear connection frame 26 and forward connection frame 28. These wheels or rolling elements are constructed of lightweight, low frictional heat resistant materials. Composite materials such as thermoset plastics offer a high operating temperature and will typically burn before they melt. For the coating of the skid plate 60, thermoset plastics such as PTFE, also known as Teflon, PPSU or polyphenylsufone, or PEEK, and polyamideiamide may be used to coat the skid plate 60 as well as provide for high heat resistant adequate structural materials.

While the current embodiment attaches to a SCBA frame 14, alternative embodiments can be incorporated into the SCBA frame 14 as a unitary element or unitary structure.

In lieu of connecting directly to the SCBA frame 14, as seen in FIGS. 1-4, to avoid the modification cost of attaching to the existing SCBA frames 14 or providing new SCBA frames which have integrated transportation rescue apparatuses 10, a temporary clamping strap or other device which enables the rescue apparatus 10 to be temporarily connected to the SCBA 12 is provided in the following alternative embodiment.

Referring to FIG. 5, a clamping strap 80 is attached to the inner surface of the skid plate 60 and has U-shaped clamps 84 which attach to the belt hole 86 of the SCBA frame 14. In this current embodiment, the clamping strap 80 can be tensioned by a tightening screw 85 similar to the mounting strap 16 connection apparatus.

The skid plate 60 has an interior SCBA casing seat 82 which provides for a seating position for the SCBA 12. Essentially, the interior SCBA casing seat 82 is a semi-cylindrical shell which is configured to receive the outside cylindrical surface of the SCBA tank 13. In the presently discussed embodiment, the rolling elements in this concept are ball transfers 90 which provide for multidirectional translation similar to wheels 36 placed on casters.

The tightening screw 85 operates to securely tension the clamping straps 80 so that during a rescue operation if the injured fireman is laying face down for example, turning the fireman over provides a certain amount of moment or torsional force about the longitudinal axis 30 (see FIG. 1) of the SCBA tank 13. This moment force needs to be resisted by an equal or greater frictional resistance of the SCBA frame 14 and the clamping straps 80 against the SCBA tank 13. In order to obtain this frictional resistance, the tightening screw 85 needs to be ratcheted down to a predetermined tension within the clamping strap 80 to provide a force normal to the outside of the tank to create the desired frictional resistance. Materials with lesser compressive resistance, such as a high elastic PVC or rubber material can be used to engage the outer surface of the SCBA tank 13 and provide the needed frictional resistance. In addition to utilizing a tightening screw 85, a locking lever or other type of simple mechanical device to enable the clamping straps 80 to obtain the desired tension for creating the desired frictional resistance to resist the torsional overturning moment during a rescue operation is required.

While the previous embodiment discussed attaching to the SCBA tank 13 and the SCBA tank frame 14 on a temporary basis, the following present embodiment as seen in FIGS. 6A, 6B and 7 provides for an integrated rescue apparatus and communications/monitoring system with optional hydration unit for the worker in the hostile environment.

In the following embodiment, the SCBA frame 14 is integrated into the perimeter shell casing whereby temporary or permanent connections to the existing SCBA frames currently on the market are no longer required.

Taking into consideration the profile shape of a typical SCBA frame 14, the back shell 94 of the current rescue apparatus 10 which is, in this embodiment, the integrated SCBA layout, has a curvilinear profile which has a lower longitudinal back section 200 substantially straight and planar within the longitudinal and lateral directions, and then follows a splined transition profile 201 within the transverse direction to an upper longitudinal head section 202. The upper longitudinal head section 202 has a deeper transverse profile to provide for more range of equipment connections, a headrest or head stop to avoid injury such as whiplash or to the rear of the head, and room for SCBA valve equipment.

The integrated SCBA rescue apparatus 10 in one form also has a lower base shell 92 or skid plate as previously discussed in FIGS. 3 and 4, but in lieu of connecting to the pre-existing SCBA frame 14, the base shell 92 in the current embodiment is provided more in the form of a trapezoidal tray shape with a rectilinear flat bottom 62 as previously discussed, and perimeter sidewalls 100 which flair out from the edges 101 of the rectilinear bottom wall 62 to meet the perimeter side walls of the back shell 102 around a perimeter locking edge 96.

Again as similar to the previously discussed embodiment in FIGS. 3 and 4, the base skid plate 92 transitions from the horizontal plane to the substantially vertically aligned side walls through the use of a radial corner 98.

On the back shell 94 of the integrated SCBA rescue apparatus 10, is positioned a backrest 206 (see FIG. 6*b*) which provides for shoulder straps 212, being connected to the backrest 206 by the use of shoulder strap anchors 214. a belt opening 208 is also arranged within the backrest 206, the belt opening 208 allows the fireman's waist belt 210 or similar apparatus to thread through the lower portion of the backrest 206 for securing the rescue apparatus integrated system 10 adequately to the back of the fireman.

Within the base shell 92 and the back shell 94 may be provided a number of components which will enable the fireman to adequately communicate with the other firemen and a base station, as well as a hydration system configured to hydrate the fireman during high temperatures or long periods of use, and the SCBA device.

The communications unit 106 of FIG. 7 in the current embodiment discussed is positioned within the upper head region of the shell casing and provides for wireless radio communication 224 with the base unit 220 and other integrated SCBA systems 222.

The communications unit 106 and the base unit 220 can take various forms of communication integration through systems such as WIFI by trademark wireless systems including Bluetooth wireless, other forms of radio transmission frequencies. Integrated with the communication unit 106 within the shell casing, may be a personal cooling hydration system 108, as well as an environmental condition monitoring system 112. Also integrated with the environmental condition monitoring system is a vital sign telemetry and warning system 110. These two systems send information back and forth between the base unit and the communications unit 106. The base station may include the on-site fire captain. In this embodiment, the personnel at the base station may be kept apprised of the team's vital signs, and environmental conditions within the, for example, burning structure.

I claim:

1. A rescue apparatus operatively configured to facilitate removal of an emergency worker from a hostile environment, said rescue apparatus comprising:
    a. a frictional drag reducing section configured to reduce the frictional resistance between the emergency worker and the hostile environment;
    b. a mounting section adapted to removably connect the frictional drag reducing section to the emergency worker;
    c. the mounting section further comprises a removable connection to a standard self-contained breathing apparatus (SCBA) comprising a tank, said tank configured to be worn on the back of said emergency worker; and
    d. whereby connecting the mounting section to the emergency worker enables the frictional drag reducing section to facilitate the removal of the emergency worker from the hostile environment.

2. The apparatus according to claim 1 wherein said apparatus further comprises: a plurality of wheels coupled to the mounting section.

3. The apparatus according to claim 1 wherein the mounting section further comprises: a frame connection component arranged to removably attach to an SCBA frame, the frame comprising a forward section and a rearward section.

4. The apparatus according to claim 3 wherein the frame connection further comprises: a frame forward section connection and a frame rearward section connection.

5. The apparatus according to claim 3 wherein the frame connection component further comprises:
    a. a first linkage apparatus configured to clamp substantially to the frame portion of an SCBA apparatus;
    b. said SCBA frame having a first side and a second side;
    c. a first portion of the first linkage apparatus configured to engage the first side of the SCBA frame;
    d. a second portion of the first linkage apparatus configured to engage the second side of the SCBA frame; and
    e. a third portion of the first linkage adaptively configured to adjust the operative spacing between the first portion and the second portion.

6. The apparatus according to claim 3 wherein the frame connection component further comprises:
    a. a quick release mechanism to attach and detach the mounting section from the SCBA frame.

7. The apparatus according to claim 1 wherein the mounting section further comprises: a tank connection component arranged to removably attach to said SCBA tank, said SCBA tank comprising a forward section and a reward section.

8. The apparatus according to claim 7 wherein the tank connection component further comprises: a tank forward section connection and a tank rearward section connection.

9. The apparatus according to claim 7 wherein the tank connection component further comprises:
    a. a first linkage apparatus configured to clamp about a portion of the SCBA tank;
    b. said SCBA tank having a first side and a second side;
    c. a first portion of the first linkage apparatus configured to forceably and frictionally engage the first side of the SCBA tank;
    d. a second portion of the first linkage apparatus configured to forceably and frictionally engage the second side of the SCBA tank; and
    e. a third portion of the first linkage adaptively configured to adjust the operative spacing between the first portion and the second portion.

10. The apparatus according to claim 9 wherein the frictional drag reducing section further comprises: a first rolling unit comprising two laterally alignable wheels positioned on said first and second portions respectively.

11. The apparatus according to claim 7 above wherein the tank connection component further comprises: a quick release mechanism to attach and detach the mounting section from the SCBA tank.

12. The apparatus according to claim 1 wherein the mounting section further comprises: a cooling hydration system.

13. The apparatus according to claim 1 wherein the mounting section further comprises: an environmental monitoring system.

14. The apparatus according to claim 1 above wherein the mounting section further comprises: a communications system.

15. The apparatus according to claim 1 wherein the frictional drag reducing section further comprises: a first rolling unit locatable at a forward, an intermediate or a rearward location of the SCBA.

16. The apparatus according to claim 1 wherein the frictional drag reducing section further comprises a skid plate.

17. The apparatus according to claim 16 wherein the frictional drag reducing section further comprises said skid plate with a plurality of wheels protruding out of the skid plate.

18. The apparatus according to claim 16 wherein the skid plate further comprises a rectilinear bottom plate profile.

19. The apparatus according to claim 16 wherein the skid plate further comprises an oval bottom plate profile.

20. The apparatus according to claim 16 wherein the skid plate further comprises a visual communication system indicating visual information about the emergency worker carrying the skid plate.

21. The apparatus according to claim 20 wherein the visual communication system further comprises an illuminated information system indicating the emergency worker's activity status.

22. A process to remove an emergency worker from a hostile environment, the emergency worker wearing a self-contained breathing apparatus (SCBA) having a tank, the process comprising:
    a. receiving notification of an incapacitated emergency worker; the incapacitated emergency worker wearing a SCBA:
    b. providing:
        i. a mounting section removably connectable to the self-contained breathing apparatus tank;
        ii. a frictional drag reducing section connected to the mounting section;
    c. sending at least one rescue emergency worker into the hostile environment;
    d. locating the incapacitated emergency worker;

e. arranging the incapacitated emergency worker to a movable position wherein the frictional drag reducing section is positioned between the incapacitated emergency worker and a portion of the hostile environment;

f. extracting the incapacitated emergency worker.

23. The method of claim 22 wherein the incapacitated emergency rescue worker is provided with the frictional drag reducing section prior to their incapacitation.

24. The method of claim 22 wherein the rescue emergency rescue worker carries the frictional drag reducing section and positions it upon the tank of the incapacitated rescue worker subsequent to locating them.

* * * * *